United States Patent
Matus et al.

(10) Patent No.: US 9,735,425 B2
(45) Date of Patent: Aug. 15, 2017

(54) SILICON-SILICON OXIDE-LITHIUM COMPOSITE MATERIAL HAVING NANO SILICON PARTICLES EMBEDDED IN A SILICON:SILICON LITHIUM SILICATE COMPOSITE MATRIX, AND A PROCESS FOR MANUFACTURE THEREOF

(71) Applicant: EOCELL LTD., Hong Kong (HK)

(72) Inventors: Yuriy Matus, Pleasanton, CA (US); Michael Pak, Belmont, CA (US)

(73) Assignee: EOCELL LTD, Hong Kong (HK)

( * ) Notice: Subject to any disclaimer, the term of this patent is extended or adjusted under 35 U.S.C. 154(b) by 0 days.

(21) Appl. No.: 15/058,359

(22) Filed: Mar. 2, 2016

(65) Prior Publication Data

US 2016/0260967 A1    Sep. 8, 2016

Related U.S. Application Data

(60) Provisional application No. 62/126,766, filed on Mar. 2, 2015.

(51) Int. Cl.

| | |
|---|---|
| *H01M 10/0525* | (2010.01) |
| *H01M 4/38* | (2006.01) |
| *H01M 4/04* | (2006.01) |
| *H01M 4/134* | (2010.01) |
| *H01M 4/1395* | (2010.01) |
| *H01M 4/36* | (2006.01) |
| *H01M 4/48* | (2010.01) |
| *H01M 4/62* | (2006.01) |
| *H01M 4/131* | (2010.01) |
| *H01M 4/485* | (2010.01) |
| *H01M 4/02* | (2006.01) |

(52) U.S. Cl.
CPC ......... *H01M 4/386* (2013.01); *H01M 4/0402* (2013.01); *H01M 4/131* (2013.01); *H01M 4/134* (2013.01); *H01M 4/1395* (2013.01); *H01M 4/364* (2013.01); *H01M 4/382* (2013.01); *H01M 4/483* (2013.01); *H01M 4/485* (2013.01); *H01M 4/625* (2013.01); *H01M 10/0525* (2013.01); *H01M 2004/027* (2013.01); *H01M 2220/20* (2013.01); *H01M 2220/30* (2013.01)

(58) Field of Classification Search
CPC .. H01M 4/405; H01M 4/386; H01M 10/0525; H01M 2004/027

USPC ............... 252/506, 504, 500, 519.1, 518.1; 428/403, 404; 427/126.1, 126.2, 126.3, 427/122

See application file for complete search history.

(56) References Cited

U.S. PATENT DOCUMENTS

| | | | |
|---|---|---|---|
| 9,444,090 B2 * | 9/2016 | Liu | H01M 4/133 |
| 2007/0224508 A1 * | 9/2007 | Aramata | H01M 4/134 429/231.95 |
| 2009/0274849 A1 * | 11/2009 | Scott | H01M 4/485 427/457 |
| 2013/0216894 A1 * | 8/2013 | Wang | H01M 4/13 429/158 |
| 2013/0280609 A1 * | 10/2013 | Chan | C01B 33/00 429/218.1 |
| 2014/0138574 A1 * | 5/2014 | Gao | C01B 33/02 252/182.1 |
| 2015/0111099 A1 * | 4/2015 | Zhang | H01M 4/13 429/212 |
| 2015/0132641 A1 * | 5/2015 | Yakovleva | B22F 1/0062 429/215 |
| 2016/0093884 A1 * | 3/2016 | Cui | H01M 4/364 252/506 |
| 2016/0164073 A1 * | 6/2016 | Liu | H01M 4/364 429/231.8 |

FOREIGN PATENT DOCUMENTS

WO   WO 2016141032 A1 *   9/2016   ......... H01M 4/0402

* cited by examiner

*Primary Examiner* — Douglas Mc Ginty

(57) ABSTRACT

A process for producing a silicon:silicon oxide: lithium composite (SSLC) material useful as a negative electrode active material for non-aqueous battery cells includes: producing a partially lithiated SSLC material by way of mechanical mixing; subsequently producing a further prelithiated SSLC material by way of spontaneous lithiation procedure; and subsequently producing a delithiated SSLC material by way of reacting lithium silicide within the dispersed prelithiated SSLC material with organic solvent(s) to extract lithium from the prelithiated SSLC material, until reactivity of lithium silicide within the prelithiated SSLC material with the organic solvent(s) ceases. The delithiated SSLC material is a porous plastically deformable matrix having nano silicon embedded therein. The delithiated SSLC material can have a lithium silicide content of less than 0.5% by weight. A battery cell having as its negative electrode active material an SSLC material as set forth herein can exhibit an irreversible capacity loss of less than 10%.

11 Claims, 3 Drawing Sheets

SILICON-SILICON OXIDE-LITHIUM COMPOSITE MATERIAL HAVING NANO SILICON PARTICLES EMBEDDED IN A SILICON:SILICON LITHIUM SILICATE COMPOSITE MATRIX, AND A PROCESS FOR MANUFACTURE THEREOF

TECHNICAL FIELD

Aspects of the present disclosure relate to a silicon-silicon oxide-lithium silicate composite (SSLC) based material having nano silicon particles embedded in a silicon:lithium silicate composite (Si:LSC) matrix, and a process for preparing the same. The SSLC based material is useful as a negative electrode active material (where a negative electrode conventionally corresponds to a negative terminal of a battery or battery cell during battery discharge) for non-aqueous electrolyte battery cells, such as lithium ion battery cells.

BACKGROUND

The rapid development and market growth of mobile devices and electric vehicles has resulted in strong demand for low cost, small size, lightweight, high energy density secondary batteries, such as lithium ion batteries. In the development of high energy density secondary batteries, cathode material technology is a well-recognized bottleneck, because cathode materials exhibit a lower capacity than anode materials. However cathode materials capacity improvement has been incremental, while anode capacity improvement can be improved many times by moving from conventional graphite to none carbon based anode materials. Consequently, there have been extensive development efforts to produce high capacity anode materials, because a higher capacity anode can significantly increase the energy density of a commercial secondary battery, for instance, by up to 25%, when the battery is fabricated using a given type of commercially available cathode material technology.

Silicon (Si) has been investigated as an anode material for lithium ion (Li$^+$) batteries because it exhibits a high theoretical capacity (e.g., up to 3750-4200 mAh/g) as a battery cell anode material, and is an abundant, inexpensive element that is readily available as a result of its widespread use in the semiconductor industry. The electrochemical lithiation and delithiation of silicon can be generally represented as

$$xLi^+ + Si + xe^- \leftrightarrow Li_xSi \qquad (1)$$

With respect to the use of silicon as an anode material, this high theoretical capacity results in a significant theoretical increase in the energy density and specific energy of the cell compared to graphite anode materials.

Pure silicon anodes show excellent cyclic performance when a nano thin Si film is coated on conducting graphite/carbon, or when nano sized Si is composited with nano featured metal current collectors. Silicon nano wire and silicon nano particles also show good cyclic performance depending on the properties of various polymeric binders used therewith. However, these nano structured silicon anodes work well only at very low loading density. To increase the energy density of the battery cell, the loading density of the anode is increased. This means the anode is impregnated with a higher ratio of active material weight to inactive components in lithium ion cells. However, as the loading density increases, the electrodes collapse after initial cycles and the cyclic performance deteriorates.

Unfortunately, silicon anodes also exhibit a large first-cycle capacity loss, side reactions during cycling, and a very large volume change during battery cell charge-discharge or lithiation-delithiation cycles (e.g., up to 300-400%). With respect to this volume change, during lithium ion battery cycling, the Si anode is lithiated by intercalation (i.e., reversible insertion) of 4.4 Li atoms per Si atom. The very large volume change leads to mechanical failure and capacity fading.

Silicon oxide (SiO$_x$) has also been investigated for use as an anode material for lithium ion batteries, particularly because this material shows much less volume change after the first cycle compared to pure silicon anode materials. SiO$_x$ is regarded as a uniform mixture of nano sized Si and SiO$_2$ phases that form upon energetic treatment of original SiO$_x$ material, as described by K. Schulmeister and W. Mader in "TEM investigation on the structure of amorphous silicon monoxide," *Journal of Non-Crystalline Solids* 320 (2003), pp. 143-150. When the molar ratio of Si to SiO$_2$ is 1, its volumetric ratio is 0.5. This indicates that nano silicon particles are embedded in a matrix of SiO$_2$ in the SiO$_x$ material structure.

The electrical conductivity of SiO$_x$ is low, and as SiO$_x$ is lithiated its electrical conductivity decreases. This poor electrical conductivity contributes to decreases in utilization of SiO$_x$ during cycling. The electrical conductivity of SiO$_x$ can be improved by mechanically milling SiO$_x$ (0.8<x<1.5) with graphite using high energy mechanical milling, as described in U.S. Pat. No. 6,638,662; or coating SiO$_x$ particles with a uniform carbon layer using thermal Chemical Vapor Deposition (CVD), as described in Japanese patent publication JP-A 2002-042806. These techniques successfully increase charge-discharge capacity, but fail to provide sufficient cyclic performance, and thus do not meet the market requirements for high energy density batteries. Therefore, such techniques have not been successfully utilized to produce commercial products in the market, as further improvement in cycle performance is imperative.

Another problematic electrochemical property of SiO$_x$ based anodes is a high irreversible capacity loss on the first charge/discharge cycle below a practical level, as described in U.S. Pat. No. 5,395,811. As indicated in U.S. Pat. No. 7,776,473, the irreversible capacity loss of SiO$_x$ anode material can be reduced by way of prelithiating the SiO$_x$ material.

U.S. Pat. Nos. 7,776,473 and 8,231,810 respectively indicate the following reactions between lithium and SiO:

$$4Li + 4SiO \rightarrow Li_4SiO_4 + 3Si \qquad (2)$$

$$4Li + 4SiO \rightarrow 3Si:Li_4SiO_4 \qquad (3)$$

The chemical reaction mainly forms lithium silicate (Li$_4$SiO$_4$) and silicon. In view of the aforementioned mixture of nano sized Si and SiO$_2$ within SiO$_x$, the reaction between lithium and SiO$_x$ can be expressed as follows:

$$4Li + 2SiO_2 \rightarrow Li_4SiO_4 + Si \rightarrow Si:Li_4SiO_4(Si:LSC) \qquad (4)$$

Depending on reaction conditions, some research groups have indicated that lithium silicate consists of Li$_4$SiO$_4$, Li$_2$O, and Li$_2$SiO$_3$. The major component may be Li$_4$SiO$_4$. The irreversible chemical reaction of Li and the SiO$_2$ matrix in the SiO$_x$ structure also forms a certain amount of lithium silicide (Li$_y$Si).

During the first lithiation of SiO, when the SiO$_2$ phase irreversibly changes into the mixture of Li$_4$SiO$_4$ and Li$_y$Si, the volume increases by a factor of two. During delithiation, Li$_4$SiO$_4$ remains Li$_4$SiO$_4$, and Li$_y$Si becomes silicon. As a result, Si:LSC (Si:Li$_4$SiO$_4$) becomes porous, and because of plastic deformation of Li$_4$SiO$_4$, the volume change from Li$_y$Si:Li$_4$SiO$_4$ to Si:Li$_4$SiO$_4$ can be minimized. Consequently, the volume change of SiO$_x$ based anode particles is much smaller than that of pure silicon anode particles after the first cycle. Additionally, SiO$_x$ based anodes generally show much better cyclic performance compared with pure Si based anodes after the first cycle, under the condition that both are micro-sized.

U.S. Pat. No. 7,776,472 teaches the prelithiation of SiO$_x$ by milling SiO$_x$ powder with active lithium powder through a high energy ball milling process. This prelithiation successfully reduces the irreversible capacity loss from 35% to 15%. However, U.S. Pat. No. 7,776,472 also indicates that as a result of this prelithiation process, the reversible capacity was only 800 to 900 mAh/g, whereas most SiO$_x$ anodes coated with graphite show a reversible capacity of 1400 to 1700 mAh/g. Unfortunately, the results obtained by the process of U.S. Pat. No. 7,776,472 are not sufficient for satisfying the characteristics required for a commercial anode material. Lower irreversible capacity loss of the first cycle and improved cyclic performance are still required.

Further to the foregoing, while anode material prelithiation can reduce irreversible capacity loss, prelithiated anode materials have an undesirably high chemical reactivity due to the presence of highly reactive, chemically unstable lithium therein. This high chemical reactivity can lead to difficulties in handling and processing prelithiated anode materials during conventional battery manufacturing processes, or render the prelithiated anode materials incompatible with conventional battery manufacturing processes. For instance, prelithiated anode materials may be incompatible with solvents, binders, thermal processing conditions, and/or ambient environments commonly encountered in battery manufacturing processes. A need also exists to overcome this problem.

DISCLOSURE

In the present disclosure, depiction of a given element or consideration or use of a particular element number in a particular FIG. or a reference thereto in corresponding descriptive material can encompass the same, an equivalent, or an analogous element or element number identified in another FIG. or descriptive material associated therewith. The use of "/" in a FIG. or associated text is understood to mean "and/or" unless otherwise indicated. The recitation of a particular numerical value or value range herein is understood to include or be a recitation of an approximate numerical value or value range, for instance, to within +/− 10%, +/− 5%, +/− 2.5%, or +/− 1% of a particular numerical value or value range under consideration.

Further Aspects of the Technical Problem

As indicated above, high capacity silicon oxide based anodes offer excellent cyclic performance at higher loading density compared to pure silicon based anodes, but silicon oxide based anodes suffer from low initial efficiency. Although irreversible capacity loss can be reduced in the manner disclosed by U.S. Pat. No. 7,776,473, the inventors of the present application have found that prelithiation in accordance with the teachings of U.S. Pat. No. 7,776,473, which is performed by ball milling solid state materials (i.e., solid silicon oxide powder and metallic lithium powder), results in incomplete and non-uniform lithiation. That is, complete, uniform prelithiation of SiO$_x$ by ball milling solid state materials in the manner disclosed by U.S. Pat. No. 7,776,473 is difficult to achieve.

U.S. Pat. No. 7,776,473 discloses that the rate of diffusion of metallic lithium into solid SiO$_x$ is low, making it difficult for metallic lithium to uniformly penetrate into the SiO$_x$. Furthermore, the use of larger amounts of metallic lithium powder during ball milling to potentially provide a greater concentration of lithium available for diffusion into SiO$_x$ is not feasible in view of safety concerns due to the highly reactive nature of lithium, as well as the need to remove decomposed products during the ball milling process. U.S. Pat. No. 7,776,473 teaches the use of a small, controlled amount of lithium powder, such that the amount of lithium added provides an atomic ratio of lithium to oxygen less than or equal to 2 (i.e., Li/O<2). U.S. 7,776,473 further teaches that after the reaction of SiO$_x$ with metallic lithium through ball milling, an organolithium compound (e.g., alkyllithium or aryllithium) can be added to compensate for or complement a lithium shortage. Notwithstanding, even with such addition of an organolithium compound (butyllithium), the prelithiation process taught by U.S. Pat. No. 7,776,473 results in a commercially unacceptable low reversible capacity of 800-900 mAh/g, in contrast to conventional carbon coated SiO$_x$ anodes that exhibit a reversible capacity of 1400-1700 mAh/g.

The prelithiation process disclosed in U.S. Pat. No. 7,776,473 cannot avoid the formation of lithium silicide. The low reversible capacity of 800-900 mAh/g obtained by the process of U.S. Pat. No. 7,776,473 indicates that after this process is performed, lithium silicide remains at the surface of the particles produced, and may be oxidized when the particles are exposed to air, thus reducing conductivity. Additionally, lithium silicide that remains on the surface of the particles will cause the gellation of an electrode slurry mixture by reacting with polymer binders or N-methylpyrolidone (NMP).

As also indicated above, prelithiated anode materials have an undesirably high chemical reactivity due to the lithium contained therein, which can lead to handling difficulties or incompatibility issues when prelithiated anode materials are used in conventional battery manufacturing processes.

Technical Solution and Summary

Embodiments in accordance with the present disclosure are directed to a fully delithiated silicon-silicon oxide-lithium composite (SSLC) particulate material or SSLC based particulate material having amorphous and/or crystalline nano silicon particles embedded in a porous, plastically deformable silicon:lithium silicate composite (Si:LSC) matrix. In various embodiments, this SSLC/SSLC based material has an average particle size of approximately 1 to 10 μm; the Si:LSC matrix has particle or grain sizes of 10-200 nm; and the nano silicon particles embedded therein have particle or grain sizes of approximately 0.5-150 nm (e.g., 0.5-80 nm, or 0.5-50 nm).

Embodiments in accordance with the present disclosure are correspondingly directed to a process for producing or manufacturing an SSLC/SSLC based material, where the process includes a first process portion involving complete or essentially complete and uniform prelithiation of SiO$_x$ and the production of the SSLC/SSLC based material having lithium silicide uniformly distributed therein; followed a second process portion involving complete or essentially complete delithiation of the SSLC/SSLC based material. The delithiated SSLC/SSLC based material is suitable for use in battery manufacturing processes (e.g., conventional battery manufacturing processes) as a result of lacking lithium therein. Embodiments in accordance with the present disclosure are further directed to use of a delithiated SSLC/SSLC based material in the production or manufacture of a battery cell or battery; and also to a battery cell anode made with the delithiated SSLC/SSLC based material.

Such a SSLC/SSLC based material when used as negative electrode active material for non-aqueous electrolyte battery cells, such as lithium ion battery cells, has many advantages. The porous, already plastically deformable Si:LSC matrix greatly reduces or minimizes any volume changes associated with lithiation/delithiation of the SSLC/SSLC based material during the charge and discharge process. When used as negative electrode active material in a lithium ion battery cell, an SSLC/SSLC based material in accordance with an embodiment of the present disclosure can exhibit a volume change of approximately 7-35% (e.g., averaging approximately 15-35%, or approximately 10-20%) between lithiation (charging) and delithiation (discharging). This compares very favorably to earlier use of Si in $SiO_2$ as anode where during lithiation anode undergoes an unacceptably large volumetric change, e.g., of up to 200%.

In view of the foregoing, when essentially fully or fully prelithiated SSLC/SSLC based material is produced in accordance with an embodiment of the present disclosure, such prelithiated SSLC/SSLC based material will exhibit or occupy a maximized, essentially maximum, or maximum volume (or correspondingly, a maximum extent of volumetric expansion). When this essentially fully or fully prelithiated SSLC/SSLC based material is then essentially fully or fully delithiated (which occurs prior to its use in a lithium ion battery, battery cell, or anode manufacturing process), it will exhibit or occupy a minimized, essentially minimum, or minimum volume (or correspondingly, a maximum extent of volumetric contraction). When such essentially fully or fully delithiated SSLC/SSLC based material is subsequently used as an anode active material in a battery cell, in association with battery cell (re)charging and discharging by way of anode active material lithiation and delithiation, respectively, the volume change of the SSLC/SSLC based anode active material will approximately range or transition between the aforementioned volumetric extremes, e.g., the maximum volume of the prelithiated SSLC/SSLC based material and the minimum volume of the delithiated SSLC/SSLC based material.

Because the maximum extent of volumetric change, transition, shift, or swing of the SSLC/SSLC based active anode material in a lithium ion battery cell is limited to 10-35% rather than a much or dramatically larger volumetric change such as 200%, this means that either (a) for a given, target, or predetermined size anode, the use of the SSLC/SSLC based material in battery cell manufacturing can result in a battery cell having a significantly or much greater energy density/capacity; or (b) a significantly or much smaller amount of SSLC/SSLC based material can be used in a battery cell manufacturing process to produce an anode for a given energy density/capacity, resulting in a much smaller or thinner anode and hence a significantly or much smaller or thinner battery cell with higher energy density/capacity. For instance, an SSLC/SSLC based material in accordance with an embodiment of the present disclosure can exhibit an energy density that is approximately 300% greater than that of a conventional graphite material. Therefore, the use of an SSLC/SSLC based material as an anode active material in a lithium ion battery cell means that (i) for a battery cell anode of a given, target, or predetermined size, the battery cell can have a capacity that is roughly or approximately 300% greater than a battery cell that uses conventional graphite material as its active anode material; or (ii) for a battery cell of a given, target, or predetermined capacity, the size of the battery cell anode can be roughly or approximately ⅓ that of a battery cell anode that uses conventional graphite material as its active anode material.

Further to the foregoing, individuals having ordinary skill in the relevant art will recognize that the extent or range of the battery cell's overall volumetric change as a result of (re)charging and discharging will be less than the extent of volumetric change of the battery cell's anode. More particularly, the overall extent of the battery cell's volumetric change depends upon the thickness of the battery cell's anode relative to the thickness of the battery cell's cathode; and the anode is commonly or typically significantly or much thinner than the cathode (e.g., the anode may only be approximately ⅓ as thick as the cathode). Moreover, cathode active materials commonly exhibit a smaller or much smaller change in volume in association with battery cell (re)charging and discharging. Consequently, the overall extent of volume change or volumetric expansion and contraction of a battery cell that uses as its active anode material an SSLC/SSLC based material in accordance with an embodiment of the present disclosure can be approximately 3-10% (e.g., approximately 5%-8%).

Additionally, a lithium ion battery cell that includes an SSLC/SSLC based anode material in accordance with an embodiment of the present disclosure can exhibit a reversible capacity loss of less than 15% (e.g., less than 12%, or less than 10%, or within a range of approximately 8%-12%), which is a significant reduction in irreversible capacity loss compared to the prior art, and which meets commercial requirements.

Moreover, such a lithium ion battery cell can exhibit a reversible capacity of greater than approximately 1100 mAh/g (e.g., 1200 mAh/g or higher). Lastly, to facilitate its use in an anode or anode cell manufacturing process, the SSLC/SSLC based material is delithiated prior to its use in the manufacturing process, and will not contain active lithium therein (i.e., the SSLC/SSLC based material would have been delithiated, such that the lithium from the active lithium silicide would have been removed from the final as-produced SSLC/SSLC based material), and hence does not give rise to battery manufacturing process related handling or incompatibility issues.

In the disclosure herein, an SSLC based material can be defined as an SSLC material in which $SiO_x$ has been conductivity-enhanced prior to or in association with prelithiation. For instance, an SSLC based material can be a silicon-silicon oxide-lithium-carbon or silicon-silicon oxide-lithium-carbon based composite (SSLCC) material, in which the electrical conductivity of $SiO_x$ has been enhanced by way of treating or combining the $SiO_x$ with a carbon based material such as graphite prior to or in association with prelithiation, as further detailed below. For purpose of brevity and simplicity, in the description that follows, the term "SSLC material" encompasses or includes an SSLC based material such as an SSLCC material.

In accordance with an aspect of the present disclosure, a process for producing a silicon:silicon oxide: lithium composite (SSLC) material includes peforming a prelithiation process and a delithiation process. The prelithiation process results in the production of a prelithiated material, and includes producing a partially lithiated SSLC material by way of a mechanical mixing procedure comprising milling silicon oxide powder and lithium powder; and producing a further prelithiated SSLC material by way of a spontaneous lithiation procedure including: compressing the partially lithiated SSLC material matrix material; and exposing the compressed partially lithiated SSLC material to an lithium based electrolyte, wherein spontaneous lithiation procedure completes reaction of unreacted lithium and $SiO_x$ in the partially lithiated SSLC material, until unreacted lithium disappears and a uniform composition of lithium silicides is achieved in the SSLC material by lithium diffusion. The delithiation process follows the prelithination process and results in the production of a delithiated SSLC material. The delithiation process includes dispersing the compressed further prelithiated SSLC material in a liquid carrier medium to thereby produce a dispersed prelithiated SSLC material; and exposing the dispersed prelithiated SSLC material to a volume of one or more organic solvents to thereby react lithium silicide within the dispersed prelithiated SSLC material with the one or more organic solvents and extract lithium from the dispersed prelithiated SSLC material, until reactivity of lithium silicide within the dispersed prelithiated SSLC material with the one or more organic solvents ceases, wherein the volume of the one or more organic solvents acts as a reservoir with respect to reacting with lithium silicide within the dispersed prelithiated SSLC material, wherein the delithiated SSLC material comprises a porous plastically deformable Si:lithium silicate composite (Si:LSC) matrix having nano silicon particles embedded therein.

The delithiated SSLC material can have a lithium silicide content of less than 0.5% by weight. The delithiated SSLC material can have a particle size of 1 to 10 μm, the Si:LSC matrix can exhibit a grain size of 10-200 nm, and the nano silicon particles can have a particle size of 5-150 nm (e.g., 5-80 nm, or 5-50 nm). In various embodiments, the delithiated SSLC material has a silicon content of 30%-60% by weight, an oxygen content of 25%-40% by weight, and a lithium content of 10%-20% by weight. The delithiated SSLC material can have a composition of approximately 37% silicon by weight, approximately 18% lithium by weight, and approximately 43% oxygen by weight.

The liquid carrier medium includes an aprotic solvent, and the one or more organic solvents includes an alcohol. For instance, the liquid carrier medium can include hexane, and the one or more organic solvents can include ethanol, glycerol, and/or polyvinyl alcohol (PVA).

The silicon oxide powder can be characterized as SiOx (0.8<x<1.6), and the mechanical mixing procedure can include ball milling the silicon oxide powder with the lithium powder, and the lithium powder can include or be SLMP®.

The process can include performing a first electrical conductivity enhancement process prior to the prelithiation process, wherein the first electrical conductivity enhancement process comprises least one of ball milling the silicon oxide powder with a carbon based material, and coating the silicon oxide powder with a carbon based material. Additionally or alternatively, the process can include performing a second electrical conductivity enhancement process after the delithiation process, wherein the second electrical conductivity enhancement process comprises at least one of ball milling the silicon oxide powder with a carbon based material, and coating the silicon oxide powder with a carbon based material. The carbon based material can include at least one of graphite, carbon black, buckyballs, carbon nanotubes, carbon megatubes, and carbon nanobuds.

In accordance with an aspect of the present disclosure, a delithiated SSLC material is produced by the process set forth above and has a lithium silicide content of less than 0.5% by weight.

In accordance with an aspect of the present disclosure, a delithiated SSLC material that is produced by the process set forth above and which has a lithium silicide content of less than 0.5% by weight is used in a battery cell negative electrode manufacturing process.

In accordance with an aspect of the present disclosure, a lithium ion battery cell has as its negative electrode active material an SSLC material, and exhibits an irreversible capacity loss of less than 15% (e.g., less than 12%, or less than 10%). The SSLC active material can be produced by the process set forth above. An anode of the lithium ion battery cell can exhibit a volume change of 10-35% (e.g., an average volume change of 15-25%, or an average volume change of 20%) in association with lithium ion battery cell charging and discharging.

Particular Advantageous Effects

An SSLC material production process in accordance with an embodiment of the present disclosure provides a simple, robust, commercially scalable, cost effective process by which an SSLC material useful as a negative electrode material that satisfies market requirements can be produced. The SSLC material can be used as a negative electrode material to produce a lithium ion battery anode that exhibits more uniform or uniform and greatly reduced or minimal, volume change as a result of lithiation and delithiation, and which has an irreversible capacity loss that is significantly or greatly reduced compared to prior $SiO_x$ based anodes. To facilitate its use in battery manufacturing processes, the SSLC material is completely delithiated, and thus the SSLC material is compatible with solvents, binders, thermal processing conditions, and/or ambient environments associated with typical battery manufacturing processes. In addition, an electrode slurry containing an SSLC material produced in accordance with an embodiment of the present disclosure forms a good laminated electrode structure without forming a deleterious gel, even when a relatively large amount of lithium has been used to prelithiate $SiO_x$ particles.

DETAILED DESCRIPTION OF REPRESENTATIVE EXAMPLE EMBODIMENTS

Overview of a Representative SSLC Material Production Process

Figure 1:
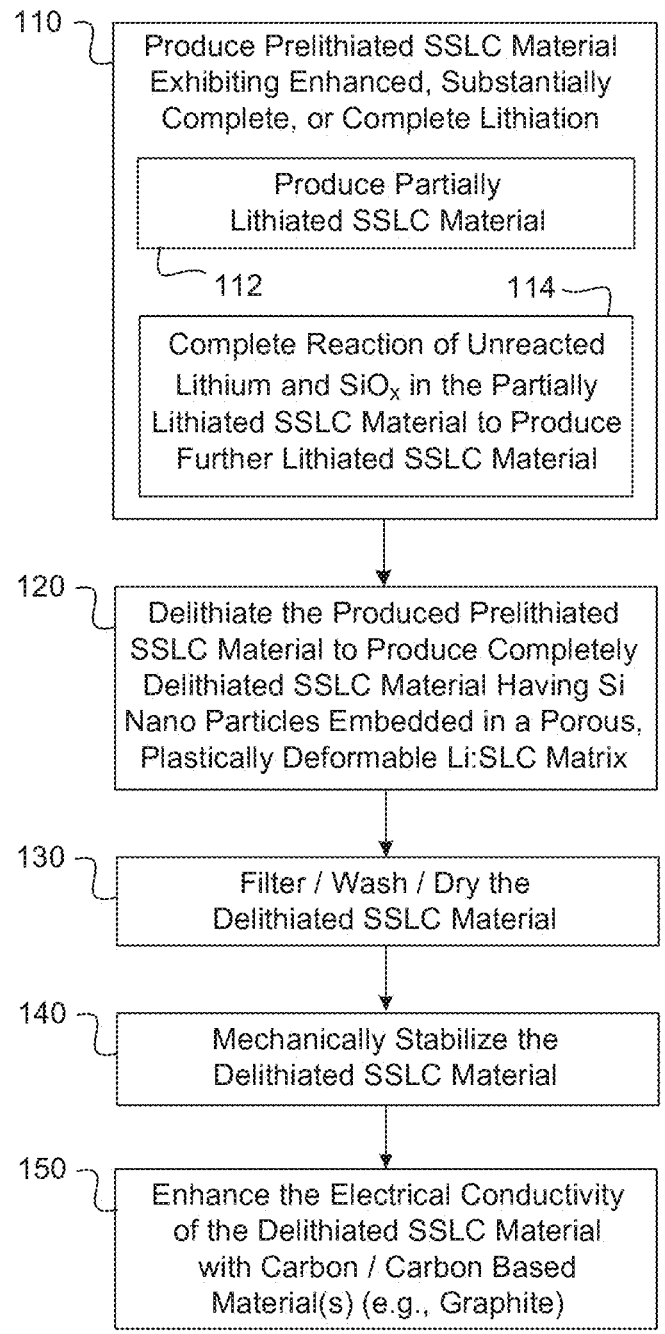
FIG. 1 is a flow diagram of a representative process for producing or manufacturing a silicon-silicon oxide-lithium composite (SSLC) material structure, or composition in accordance with an embodiment of the present disclosure.

FIG. 1 is a flow diagram of a representative process 100 for producing or manufacturing an SSLC material, material structure, or composition in accordance with an embodiment of the present disclosure. In various representative embodiments, the SSLC material production process 100 includes a first process portion 110 by which prelithiated SSLC material is produced; a second process portion 120 by which this prelithiated SSLC material is delithiated; a third process portion 130 by which the delithiated SSLC material is filtered, washed, and dried; possibly a fourth process portion 140 by which the delithiated SSLC material is coated with one or more materials for purpose of enhancing mechanical or structural integrity or stability; and typically a fifth process portion 150 by which the delithated SSLC material or the mechanically stabilized SSLC material is coated or combined with carbon or a carbon based material to enhance electrical conductivity. Aspects of the SSLC material production process 100 are described in detail hereafter.

The first process portion 110 produces the prelithiated SSLC material by way of a first or initial prelithiation procedure 112, followed by a second or subsequent prelithiation procedure 114. The first prelithiation procedure 112 produces a partially lithiated SSLC material, after which the second prelithiation procedure 114 produces an SSLC material that exhibits a significantly enhanced, substantially complete, or complete extent of lithiation compared to the prior art. More particularly, in the first prelithiation procedure, $SiO_x$ and/or conductivity-enhanced $SiO_x$ in powder form can be mixed, combined, and/or reacted with metallic lithium, such as stabilized lithium powder (e.g., SLMP® from FMC Corporation, Charlotte, N.C. USA, www.fmclithium.com), to produce the partially lithiated SSLC material in powder form. The first or initial prelithiation procedure 112 can be similar, generally analogous, analogous, substantially identical, essentially identical, or identical to that disclosed in U.S. Pat. No. 7,776,473, which is incorporated herein by reference. Conductivity-enhanced $SiO_x$ can be produced for use in or as part of the first prelithiation procedure 112 by way of treating, coating, or combining $SiO_x$ with one or more carbon or carbon based material such as graphite, carbon black, graphene, buckyballs, carbon nanotubes, carbon megatubes, and/or carbon nanobuds in a conventional manner, as will be readily understood by individuals having ordinary skill in the relevant art. In some embodiments, conductivity-enhanced $SiO_x$ is produced by ball milling $SiO_x$ with one or more carbon or carbon based materials, which can result in carbon or carbon based particles entering or becoming part of agglomerated $SiO_x$ particles produced during ball milling. Such ball milling can occur by way of a procedure that is similar, generally analogous, analogous, substantially identical, essentially identical, or identical to the ball milling of $SiO_x$ powder with graphite as described in U.S. Pat. No. 6,638,662, which is also incorporated herein by reference. Additionally or alternatively, conductivity-enhanced SiOx can be produced for use in the first prelithiation procedure 112 by way of another technique, such as thermal CVD by which carbon or a carbon based material is deposited on the $SiO_x$ powder prior to its reaction with the lithium powder.

Reacting $SiO_x$ and/or conductivity-enhanced $SiO_x$ powder with stabilized lithium powder can be carried out using a temperature controlled mixing/reaction device that applies a high shear stress in an inert gas atmosphere (e.g., an argon atmosphere, or an atmosphere containing helium), and which provides effective dissipation of heat generated during the reaction. Such a reaction device can be a ball mill, for instance, a planetary ball mill such as that described in U.S. Pat. No. 7,776,473, having a thermally regulated or thermally conductive reaction container, vessel, or jar in which $SiO_x$ and/or conductivity-enhanced $SiO_x$ powder with stabilized lithium powder are mixed. Mixing/reaction device related parameters that can influence or determine the characteristics of the partially lithiated SSLC material include the heat release, heat transfer, and shear stress during the reaction, and the characteristics of the partially lithiated SSLC material can vary with charge, rotational speed, and/or milling time, in a manner readily understood by individuals having ordinary skill in the art.

When electrical conductivity-enhanced $SiO_x$ is used in the first process portion 110, the electrical conductivity enhancement can result in the $SiO_x$ having a significantly improved thermal conductivity (e.g., when the electrical conductivity-enhanced $SiO_x$ includes or is $SiO_x$ reacted or coated with graphite), which can aid heat dissipation and thermal regulation during ball milling, as further detailed below.

The first process portion 110 further includes subjecting the partially lithiated SSLC material to the second prelithiation procedure 114, in which the partially lithiated SSLC material is compressed (e.g., compressed into pellets or pelletized in a conventional manner, such as by way of conventional pelletizing equipment (i.e., a pelletizer) or press, or direct compression tableting equipment) and immersed in a lithium based electrolyte solution (e.g., a lithium salt based electrolyte solution, or an equivalent thereto) in order to complete the reaction of unreacted lithium and $SiO_x$ in the partially lithiated SSLC material, until all unreacted lithium disappears and an enhanced uniformity or uniform composition of lithium silicides is achieved in the SSLC material by lithium diffusion. The partially lithiated SSLC material can alternatively be immersed in another type of chemical solution, for instance, an ester, a carbonate, or a solvent used in Li ion battery electrolyte solvent, in a manner understood by individuals having ordinary skill in the relevant art.

As a result of the second prelithiation procedure 114, the SSLC material exhibits much more uniform or uniform lithiation, for instance, over a shorter or greatly or significantly reduced time period (e.g., as compared to ball milling alone), as well as an extent of prelithiation that is greater, significantly greater, or much greater than the extent of prelithiation achieved by the teachings of U.S. Pat. No. 7,776,473. In multiple embodiments, the first process portion 110 (i.e., the first prelithiation procedure 112 in combination with the second prelithiation procedure 114) results in a substantially complete, essentially complete, or complete lithiation of the SSLC material, which includes lithium silicide uniformly or generally uniformly distributed therein.

The second prelithiation procedure 114 further and possibly completely lithiates the SSLC material in a uniform or highly uniform manner, which enables the SSLC to achieve maximum volumetric plastic deformation of the SSLC material such that most of the free Si nanoparticles in the SSLC form lithium silicide. If the second prelithiation procedure 114 is not carried out, there is a chance that the SSLC material may expand further or greatly when the delithiathed SSLC material is charged during actual use as anode active material, which will cause unwanted volumetric expansion. Additionally, if the SSLC material is more fully or completely liathiated by way of the second prelithiation procedure 114, the energy density and capacity of the SSLC material can be enhanced or maximized/optimized such that the Si nano particles in the amorphous delithiated SSLC material have greater capacity to receive lithium ions without excessive increase in its volume. In various embodiments, after the first process portion 110 (i.e., upon completion of the first and second prelithiation procedures 112, 114, the extent of prelithiation of the SSLC material can range from approximately 25%-75%, or approximately 25%-100%.

Following the first process portion 110 (i.e., after the first and second prelithiation procedures 112, 114 have been performed), in various embodiments the SSLC material production process 100 further includes a second process portion 120 that involves delithiating the prelithiated SSLC material in a delithiation reactor, to thereby produce a delithiated SSLC material in which amorphous and/or crystallite silicon nanoparticles are embedded in an Si:LSC matrix, and any unreacted lithium and active lithium silicide do not remain. The second process portion 120 involves dispersing the lithiated SSLC material in an organic solvent or an organic solvent mixture, and controllably reacting this dispersed lithiated SSLC material with an alcohol that reacts with lithium silicide such that the lithiated SSLC material loses lithium, thereby becoming essentially completely, completely, or fully delithiated SSLC material. For instance, after the second process portion 120, the delithiated SSLC material can have a lithium silicide content of less than approximately 0.5% by weight.

Figure 2:
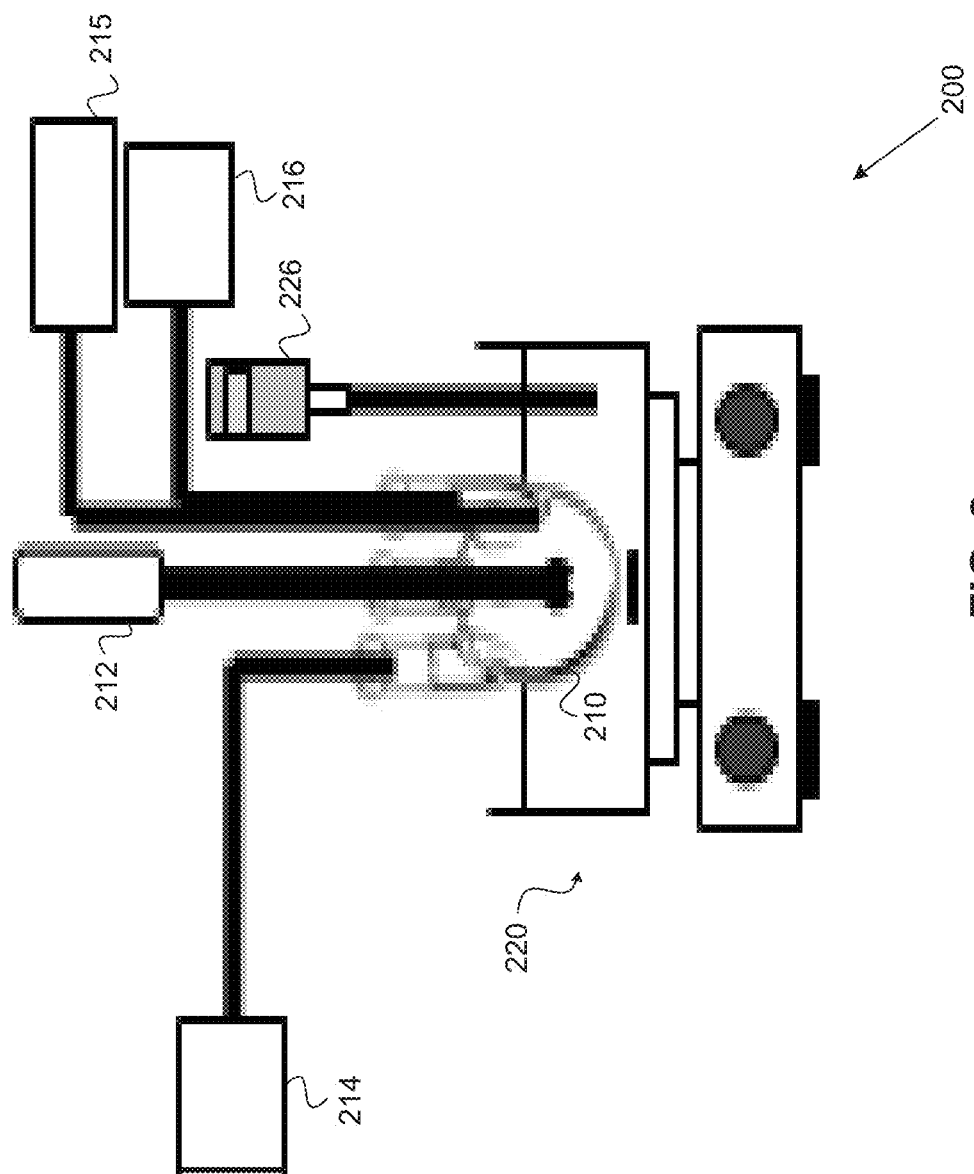
FIG. 2 is a schematic illustration of a representative delithiation reactor in accordance with an embodiment of the present disclosure.

FIG. 2 is a schematic illustration of a representative delithiation reactor 200 in accordance with an embodiment of the present disclosure. In an embodiment, the delithiation reactor includes a reaction vessel 210; an alcohol source or supply 212 having a conduit or feed line into the reaction vessel 210; an inert gas supply (e.g., an argon gas supply) 214 having a conduit or feed line into the reaction vessel 210; a gas exhaust 215 having a conduit or exhaust line leading from the reaction vessel 210; and a first temperature probe 216 having a temperature sensing device (e.g., a thermocouple) disposed in the reaction vessel 210. The reaction vessel 210 is disposed in a cooling bath 220, which is associated with or includes a second temperature probe 226 having a temperature sensing device (e.g., a thermocouple) disposed therein.

Figures 3A, 3B, 3C:
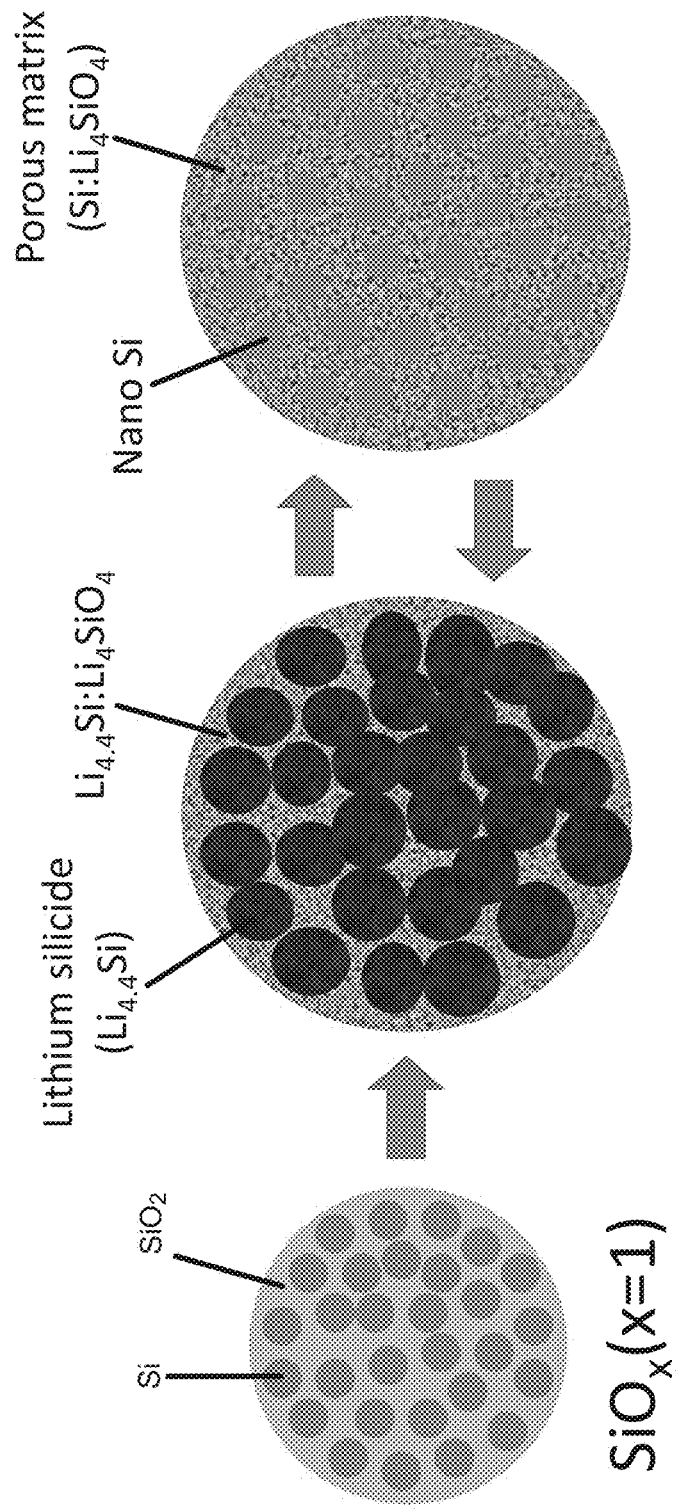
FIGS. 3A-3C are illustrations of representative microstructural characteristics of SiOx (x=1); representative microstructural characteristics of prelithiated SSLC produced in accordance with an embodiment of the present disclosure; and representative microstructural characteristics of delithiated SSLC produced in accordance with an embodiment of the present disclosure, respectively.

FIGS. 3A-3C are illustrations showing representative microstructural characteristics of $SiO_x$ (x=1); representative microstructural characteristics of prelithiated SSLC produced in accordance with an embodiment of the present disclosure; and representative microstructural characteristics of delithiated SSLC produced in accordance with an embodiment of the present disclosure, respectively. In view of FIG. 1 and FIGS. 3A-3C, the first process portion 110 reacts $SiO_x$ powder with lithium powder to irreversibly transform or plastically deform the $SiO_x$ powder into significantly, substantially completely, or completely prelithiated SSLC material; after which the prelithiated SSLC material is completely delithiated to produce a porous, plastically deformable Si:LSC matrix that carries amorphous and/or crystalline nano silicon particles, which can be reversibly lithiated and delithiated, in a manner readily understood by individuals having ordinary skill in the art. Thus, when the delithiated SSLC material is used as a lithium ion battery anode material, these nano silicon particles carried by the Si:LSC matrix can act as lithium intercalation sites (or analogously, lithium "receptor sites" and "donor sites," respectively), during anode material lithiation and delithiation.

In the delithiated SSLC material produced in accordance with embodiments of the present disclosure, the matrix of lithium silicate that carries the silicon nano particles behaves in a manner similar or analogous to a solid electrolyte that transports lithium ions (in)to the silicon nano particles, while greatly or dramatically reducing or minimizing volume changes. This is achieved by tightly controlling the uniform distribution of silicon nano particles and the porosity of the Si:LSC matrix during the anode material manufacturing process.

With reference again to FIG. 1, the third process portion 130 involves filtering, washing, and possibly drying the delithiated SSLC material in a conventional manner, for instance, drying in air and possibly drying under negative pressure or vacuum, where such drying can occur at a temperature between 100-120° C. (e.g., in an oven)). In the fourth process portion 140, the delithiated SSLC material can be mechanically stabilized or structurally reinforced by way of coating with one or more types of materials, such as one or more of $LiAlO_3$, $Al_2O_3$, $TiO_2$, $AlF_3$, and LiF in a conventional manner. Finally, in the fifth process portion 150, the delithiated SSLC material or the mechanically stabilized delithiated SSLC material is treated, coated, or combined with one or more carbon and/or carbon based materials such as graphite, carbon black, graphene, buckyballs, carbon nanotubes, carbon megatubes, and/or carbon nanobuds in a conventional manner. In several embodiments, the fifth process portion 150 involves coating the delithiated SSLC material or the mechanically stabilized delithiated SSLC material with a carbon based material (e.g., graphite) by way of CVD, which partially fuses the carbon based material with the delithiated SSLC material.

Following the fifth process portion 150, the delithiated SSLC material can be used as a non-aqueous electrolyte secondary cell negative electrode (anode) material.

Further Aspects of a Representative SSLC Material Production Process

In view of the foregoing, a particulate delithiated SSLC material in accordance with an embodiment of the present disclosure can be produced in powder form, which has a microstructure in which amorphous and/or crystalline silicon on the atomic level is dispersed as nano silicon grains in the Si:LSC matrix thereof. The size of the nano silicon grains is typically in the range of 0.5-80 nm, and the Si:LSC matrix typically exhibits a grain size of 10-200 nm. The SSLC material particles, i.e., the SSLC powder particulates, typically have an average particle size of 1 to 10 μm. In various embodiments, the delithiated SSLC material, i.e., the SSLC material having no unreacted lithium or lithium silicide therein, has a silicon content of 30 to 60% by weight, an oxygen content of 25 to 40% by weight; and a lithium content of 10 to 20% by weight.

In multiple embodiments, the fully prelithiated SSLC material have a composition of approximately 31% silicon by weight, approximately 32% lithium by weight, and approximately 35% oxygen by weight; and the fully delithiated SSLC material can have a composition of approximately 37% silicon by weight, approximately 18% lithium by weight, and approximately 43% oxygen by weight.

The delithiated SSLC material can be prepared by reacting silicon oxide powder typically characterized as $SiO_x$ (0.8<x<1.6) with metallic lithium powder at controlled temperature. In the absence of electrical conductivity enhancement, the SSLC material has a low electrical conductivity. Hence, it is recommended that the $SiO_x$ and/or the surface of the delithiated SSLC material undergo treatment or reaction with carbon or carbon based materials to enhance their electrical conductivity. Carbon coatings can be easily formed by way of thermal CVD, such as thermal CVD of graphite, which improves conductivity to a high level. Additionally or alternatively, a highly conductive surface can be obtained by premilling $SiO_x$ powder with an electronically conductive material such as graphite powder or carbon black powder. The amount of carbon present in or coated on the SSLC powder is typically 3 to 20% by weight, based on the weight of the SSLC material powder. The carbon coating layer maintains a chemical bond with the surface of the SSLC material, and can remain on the surface even after large volume expansion.

EXAMPLE 1

Silicon oxide powder ($SiO_x$, 0.8<x<1.6, Sigma Aldrich) and/or silicon oxide based powder is milled with lithium powder in a high energy ball milling machine using hexane as a dispersing medium under a protective argon atmosphere. The silicon oxide and/or silicon oxide based powder is premixed with stabilized lithium powder SLMP® (FMC Corporation) under an inert gas (argon) atmosphere in a closed container or vial, in 5, 10, 15, and 20% by weight increments (e.g., 6 g SiOx is premixed with 3.8 g SLMP® to prepare a sample having approximately 6 g SiOx and 0.6 g lithium, or an approximate 10% by weight sample, in a manner readily understood by individuals having ordinary skill in the relevant art. While metallic lithium is generally available in powder, foil or mass form, the use of stabilized lithium powder SLMP® (FMC Corporation) is typically preferable.

The silicon oxide and/or silicon oxide-based material premixed with metallic lithium is transferred into a ball milling container, vessel, or jar (e.g., a 50 ml or larger container); and then ball milled, i.e., mechanically mixed for reaction with lithium in a ball milling machine having an effective heat dissipation capability. The reaction container is be tightly sealed with rubber rings under an inert gas atmosphere designed for cooling control, and capable of mixing under high shear stresses. A planetary high energy ball milling machine is a good example ball milling machine for such milling process. For instance, a planetary ball milling machine produced by Retsch GmbH, containing a predetermined number of milling stainless steel or zirconium oxide balls, can be used. The mill has a tight closure, potential heat dissipation of balls, and high shear stress. The temperature of the reaction container is controlled in the range of 40 to 150° C.

In a representative embodiment, the ball milling container is rotated in forward and backward directions each for ten minutes while maintaining an internal controlled temperature (e.g., 40-150° C.). After ball milling, the container is allowed to cool, e.g., to room temperature, after which the partially prelithiated silicon-silicon oxide-lithium composite (i.e., the partially lithiated SSLC material) is removed from the container. In order to enhance or maximize the extent and uniformity of prelithiation, this partially prelithiated SSLC material is subsequently compressed into pellets in a conventional manner, with hexane elimination by filtration or evaporation. The pellets are then placed in a vessel or container and immersed in an electrolyte or a mixture of electrolytes in order to complete the reaction of unreacted lithium with $SiO_x$ powder, to thereby produce the further, substantially completely, or completely prelithiated SSLC material, which exhibits enhanced uniformity or uniform prelithiation. The temperature is controlled to prevent violent reaction of unreacted lithium with $SiO_x$.

More particularly, in a solid state reaction between a solid siliceous material such as $SiO_x$ powder and metallic lithium, the rate of lithium diffusion into the solid siliceous material is generally low. It is difficult for metallic lithium to react uniformly with the solid $SiO_x$ powder, and as a result, various chemical compositions such as unreacted lithium, unreacted $SiO_2$, and various kinds of lithium silicide and lithium silicates can be produced. One effective approach for complementing this lithium shortage is to compress the prelithiated powder into pellets and immerse the compressed pellets in an electrolyte or a mixture of electrolytes. In order to avoid a violent reaction, the temperature is controlled to start from a temperature between 5° C. to room temperature.

The pellets of the enhanced, substantially completely, or completely and uniformly prelithiated SSLC material are subsequently ground in a mortar after filtration, and dispersed in hexane again. To this newly prepared slurry, ethanol is slowly added. Lithium silicide reacts with the ethanol, and the prelithiated SSLC material thereby loses lithium. Alcohol is added until bubble formation is stopped, indicating that the completely delithiated SSLC material has been produced. After filtration and washing, the powder can be coated with $LiAlO_3$, $Al_2O_3$, $TiO_2$, $AlF_3$, LiF, and/or other material(s) (e.g., at a coating thickness of approximately 20-50 nm, or about 30 nm) for mechanical stabilization, and/or dried and coated with carbon (e.g., graphite) by way of CVD.

The silicon oxide ($SiO_x$, 0.8<x<1.6) and/or silicon oxide-based material is milled through high energy ball milling until it reaches a predetermined or desired size distribution. Consequently, it reacts with metallic lithium powder by way of the ball milling process in the inert gas atmosphere. Because the reaction is strongly exothermic, it can easily ignite and lead to a significant particle growth of Si and $SiO_2$ and loss of electrochemical activity upon disproportionation. To control the growth of the unreacted $SiO_2$ phase, the temperature of the reaction container should be controlled below 150° C.

$SiO_x$(x≅1) is a mixture of Si and $SiO_2$ at the nano scale. Because the volume of crystalline Si therein is 33%, $SiO_x$ has a structure in which nano crystalline Si particles are embedded in the matrix of $SiO_2$.

When $2SiO_2$ reacts with (4+y)Li, it forms an $Li_ySi:Li_4Si:O_4$ composite, as follows:

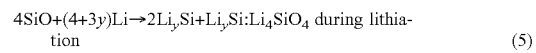
$4SiO+(4+3y)Li \rightarrow 2Li_ySi+Li_ySi:Li_4SiO_4$ during lithiation    (5)

where the $Li_ySi$ is in the form of nano particles, and the $Li_ySi:Li_4SiO_4$ is in the form of a matrix that carries the $Li_ySi$ nano particles. When delithiation occurs,

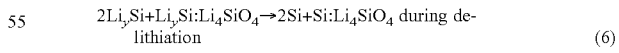
$2Li_ySi+Li_ySi:Li_4SiO_4 \rightarrow 2Si+Si:Li_4SiO_4$ during delithiation    (6)

where the Si is in the form of nano particles, and the $Si:Li_4SiO_4$ is in the form of a matrix that carries the Si nano particles.

During lithiation/de-lithiation, $Li_ySi:Li_4SiO_4$ and $Si:Li_4SiO_4$ can exist as a matrix at a certain level of lithiation (e.g., up to a limit of approximately 50%). If the reaction processes to an ignited state, the lithium silicide ($Li_ySi$) from the matrix can be agglomerated into the nano lithium silicide particles. As a result, lithium silicide particles can grow, and the lithium silicide becomes part of the matrix as the matrix of $Li_ySi:Li_4SiO_4$ loses lithium silicide to the lithium silicide particles. This will cause a large volume change during lithiation and delithiation and deteriorate cyclic performance. Therefore, it is important to perform the reaction of lithium with $SiO_x$ at a temperature not exceeding 150° C.

The use of $SiO_x$ that has been pretreated or precoated with a material that enhances its thermal conductivity prior to ball milling with SLMP® can improve heat dissipation and temperature control within the ball milling container during ball milling. For instance, the $SiO_x$ can be pretreated or precoated with a carbon or carbon based material such as graphite (e.g., by way of ball milling and/or CVD, as set forth above), which concurrently increases the electrical conductivity and the thermal conductivity of the $SiO_x$. Furthermore, because of the improved heat dissipation and better temperature control, a larger amount of lithium powder can be ball milled with a given amount of such pretreated/precoated $SiO_x$ without deleterious effect of uncontrolled heating and SiO powder agglomeration. For instance, instead of 10% incremental addition of SLMP, approximately 25% incremental addition of SLMP® can occur when the $SiO_x$ is pretreated or precoated with a carbon or carbon based material such as graphite.

During lithiation of $SiO_x$ anodes, the volume increase of $Li_ySi$ phase plastically deforms the $Li_4SiO_4$ phase in the matrix of $Li_ySi:Li_4SiO_4$. Because the volume ratio of $Li_{4.4}Si$ to $Li_4SiO_4$ in the matrix is 1, the $Li_4SiO_4$ phase may not exist as a matrix when y is close to 4.4. During delithiation, $Li_ySi$ loses lithium and its volume rapidly decreases. However, the plastically deformed $L_4SiO_4$ remains substantially or essentially unchanged or stays the same at a certain level, and becomes very porous. This can explain how the volume change before and after de-lithiation is minimized by the plastic deformation of the $Li_4SiO_4$ phase. Reaction (4) above indicates that $2Li_ySi$ nano particles are embedded in the matrix of $Li_ySi:Li_4SiO_4$. As y is close to 4.4, the volume ratio of $2Li_ySi$ to $Li_ySi:Li_4SiO_4$ is 1, and the volume increase of $2Li_ySi$ also contributes to the large plastic deformation of the $Li_ySi:Li_4SiO_4$ phase and leaves larger permanent defects in the matrix. This mechanism indicates that the volume change of lithiated $SiO_x$ anodes can be significantly minimized during lithiation/de-lithiation. As a result, the micro-sized $SiO_x$ anode generally shows much better cyclic performance than micro-sized silicon anode when both are well coated with conducting carbon.

The plastically deformed $Li_ySi:Li_4SiO_4$ may be fragile and may collapse as a result of lithiation/delithiation cycling across many cycles. In order to enhance the mechanical property of the matrix during cycling, nano film(s) such as $LiAlO_2$, $Al_2O_3$, TiO2, $AlF_3$, LiF, $SiO_2$ and/or one or more other kinds of metal oxide can coat the $SiO_x$ anode after delithiation of $Li_ySi$. The coating layer can fill the defects on the surface of $SiO_x$ anodes and support their mechanical stability. Moreover, the coating layer can aid the formation and possibly enhance the stability of a solid electrode interphase (SEI) layer formed at the anode-electrolyte interface in a lithium ion battery cell. Still further, the coating layer can increase the likelihood that a Li ion battery cell anode made using delithiated SSLC material in accordance with an embodiment of the present disclosure remains sufficiently electrically conductive across many charging/discharging or lithiation/delithiation cycles (or correspondingly, expansion/contraction cycles) over time.

To improve or further improve the conductivity of the delithiated SSLC material, carbon and/or carbon based material(s) can be applied to the delithiated SSLC material particles by thermal CVD, specifically by heating a CVD chamber in which the delithiated SSLC material resides to a temperature of 600 to 900° C. and feeding an organic matter gas or vapor into the CVD chamber. The conductive carbon can be insufficiently fused on the surface of the composite particles below 800° C. However, above a certain temperature, crystalline Si particles embedded in the matrix of $SiO_2$ in $SiO_x$ structure can be agglomerated with the silicon phase from the $Si:Li_4SiO_4$ matrix and then the crystalline silicon can grow. This increases the volume of silicon particles larger than the volume of $Li_4SiO_4$ and destroys the nano Si particles embedded $Li_4SiO_4$ structure and finally deteriorates the cyclic performance. As a result, the CVD chamber temperature should remain in the range of 800 to 950° C.

The organic material used to coat carbon via CVD can be selected from materials capable of forming carbon (graphite) through pyrolysis at the above temperature range under an inert atmosphere. Examples of hydrocarbons that can form such carbon include but are not limited to methane, ethane, ethylene, acetylene, propane, butane, butene, pentane, isobutane, and hexane alone or in an admixture thereof; and monocyclic to tricyclic aromatic hydrocarbons such as benzene, toluene, xylene, styrene, ethylbenzene, diphenylmethane, naphthalene, phenol, cresol, nitrobenzene, chlorobenzene, indene, coumarone, pyridine, anthracene, and phenanthrene alone or in an admixture thereof. Organic polymers or polymeric or oligomeric siloxanes having large hydrocarbon side chains can alternatively be used as a carbon source.

The delithiated SSLC material powder can be used as a negative electrode material in order to construct a non-aqueous electrolyte secondary cell, especially a lithium ion secondary cell, having a high capacity, good cycle performance and low irreversible capacity from the first cycle. The positive electrode active material can be selected from commercially available cathodes such as $LiCoO_2$, lithium nickel cobalt manganese oxide (NCM), lithium rich NCM, lithium nickel cobalt oxide doped with aluminum, and spinel lithium manganese oxide. The electrolytes used herein can be lithium salts such as one or more of lithium perchlorate, $LiPF_6$, $LiBF_6$, and LITFSI (Lithium Bis(Trifluoromethane-sulfonyl)Imide) in non-aqueous solution form. Examples of the non-aqueous solvents include propylene carbonate, ethylene carbonate, dimethoxyethane, .gamma.-butyrolactone and 2-methyltetrahydrofuran, alone or in an admixture.

EXAMPLE 2

A second Example is described hereafter, which is performed in a manner analogous or substantially identical to that described above for Example 1, in a manner readily understood by individuals having ordinary skill in the relevant art in view of the description herein.

$SiO_x$ powder ($SiO_x$, 0.8<x<1.6, Sigma Aldrich) is ball milled for up to 5 hours in an ethanol solvent. After SiOx particle size reduction to ~6 um occurs, the ethanol is evaporated, and graphite powder such as Mage3 graphite powder having an average particle size (D50) of 23 μm (Hitachi Chemical Co. Ltd., Tokyo, Japan) is added. The $SiO_x$ particles and graphite powder are ball milled an additional 2 hours, thus producing a $SiO_x$ based powder, namely, SiOx/graphite powder intended for prelithiation in accordance with an embodiment of the present disclosure. Next, SLMP® powder (FMC Corporation) is added to the ball mill container, and ball milling for an additional 30 minutes leads to the partial prelithiation of the original SiOx/graphite powder, and the production of a partially prelithiated SSLC material. The partially prelithiated SiOx/graphite powder is next compressed into pellets in a conventional manner, with hexane elimination by filtration or evaporation. The pellets are then immersed in an electrolyte or a mixture of electrolytes in a vessel or container in order to complete the reaction of unreacted lithium with $SiO_x$ powder, to thereby produce the enhanced, substantially completely, or completely prelithiated SSLC material having a uniform, essentially uniform, or substantially uniform distribution of lithium silicides therein.

Delithiation occurred in the delithiation reactor 200 in the manner set forth above to produce the completely delithiated SSLC material powder. The ethanol/powder slurry is dried initially using a centrifuge, followed by ambient air flow. Dried delithiated SSLC material powder is mixed with carbon black and a binder in NMP solvent, and cast on Cu foil, with subsequent drying in a vacuum oven at 250° C., for use as a negative electrode for a Li ion battery.

Aspects of particular embodiments of the present disclosure address at least one aspect, problem, limitation, and/or disadvantage associated with existing $SiO_x$ based anode materials, compositions, or structures; processes for the preparation of $SiO_x$ anode materials, compositions, or structures; and $SiO_x$ based anodes. While features, aspects, and/or advantages associated with certain embodiments have been described in the present disclosure, other embodiments may also exhibit such features, aspects, and/or advantages, and not all embodiments need necessarily exhibit such features, aspects, and/or advantages to fall within the scope of the present disclosure and the claims included herewith. It will be appreciated by a person of ordinary skill in the art that several of the above-disclosed systems, components, processes, or alternatives thereof, may be desirably combined into other different systems, components, processes, and/or applications. In addition, a person of ordinary skill in the relevant art can make various modifications, alterations, and/or improvements to various embodiments disclosed herein, which remain within the scope of the present disclosure and the claims.

The invention claimed is:

1. A method for producing a silicon:silicon oxide: lithium composite (SSLC) material, comprising:
    performing a prelithiation process to produce a prelithiated SSLC material, the prelithiation process comprising:
        producing a partially lithiated SSLC material by way of a mechanical mixing procedure comprising milling silicon oxide powder and lithium powder; and
        producing a further prelithiated SSLC material by way of a spontaneous lithiation procedure comprising:
            compressing the partially lithiated SSLC material matrix material; and
            exposing the compressed partially lithiated SSLC material to a lithium based electrolyte, wherein spontaneous lithiation procedure completes reaction of unreacted lithium and $SiO_x$ in the partially lithiated SSLC material, until unreacted lithium disappears and a uniform composition of lithium silicides is achieved in the SSLC material by lithium diffusion;
    performing a delithiation process following the prelithiation process to produce a delithiated SSLC material, the delithiation process comprising:
        dispersing the compressed further prelithiated SSLC material in a liquid carrier medium to thereby produce a dispersed prelithiated SSLC material; and
        exposing the dispersed prelithiated SSLC material to a volume of one or more organic solvents to thereby react lithium silicide within the dispersed prelithiated SSLC material with the one or more organic solvents and extract lithium from the dispersed prelithiated SSLC material, until reactivity of lithium silicide within the dispersed prelithiated SSLC material with the one or more organic solvents ceases, wherein the volume of the one or more organic solvents acts as a reservoir with respect to reacting with lithium silicide within the dispersed prelithiated SSLC material,
    wherein the delithiated SSLC material comprises a porous plastically deformable Si:lithium silicate composite (Si:LSC) matrix having nano silicon particles embedded therein.

2. The method claim 1, wherein the delithiated SSLC material exhibits a lithium silicide content of less than 0.5% by weight.

3. The method of claim 1 or 2, wherein the delithiated SSLC material has a particle size of 1-10 μm, the Si:LSC matrix exhibits a grain size of 10-200 nm, and the nano silicon particles have a particle size of 5-80 nm.

4. The method of claim 1, wherein the delithiated SSLC material has a silicon content of 30%-60% by weight, an oxygen content of 25%-40% by weight, and a lithium content of 10%-20% by weight.

5. The method of claim 1, wherein the delithiated SSLC material has a composition of approximately 37% silicon by weight, approximately 18% lithium by weight, and approximately 43% oxygen by weight.

6. The method of claim 1, wherein the liquid carrier medium comprises an aprotic solvent, and the one or more organic solvents comprise an alcohol.

7. The method of claim 1, wherein the liquid carrier medium comprises hexane, and the one or more organic solvents comprise ethanol, glycerol, and/or polyvinyl alcohol (PVA).

8. The method of claim 1, wherein the silicon oxide powder is characterized as SiOx (0.8<x<1.6), wherein the mechanical mixing procedure comprises ball milling the silicon oxide powder with the lithium powder, and wherein the lithium powder comprises SLMP®.

9. The method of claim 1, further comprising performing a first electrical conductivity enhancement process prior to the prelithiation process, wherein the first electrical conductivity enhancement process comprises least one of ball milling the silicon oxide powder with a carbon based material, and coating the silicon oxide powder with a carbon based material.

10. The method of claim 1, further comprising performing a second electrical conductivity enhancement process after the delithiation process, wherein the second electrical conductivity enhancement process comprises at least one of ball milling the silicon oxide powder with a carbon based material, and coating the silicon oxide powder with a carbon based material.

11. The method of claim 9, wherein the carbon based material comprises at least one of graphite, carbon black, buckyballs, carbon nanotubes, carbon megatubes, and carbon nanobuds.

* * * * *